United States Patent
Koike

(10) Patent No.: US 7,649,294 B2
(45) Date of Patent: Jan. 19, 2010

(54) ROTARY ELECTRIC MACHINE AND STATOR FOR ROTARY ELECTRIC MACHINES

(75) Inventor: Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 301 days.

(21) Appl. No.: 11/892,779

(22) Filed: Aug. 27, 2007

(65) Prior Publication Data
US 2008/0054750 A1 Mar. 6, 2008

(30) Foreign Application Priority Data
Aug. 30, 2006 (JP) ............................. 2006-233881

(51) Int. Cl.
*H02K 17/00* (2006.01)
(52) U.S. Cl. .................... 310/201; 310/179; 310/45
(58) Field of Classification Search .................. 310/45, 310/201, 179–180, 184, 207–208; 29/596–598
See application file for complete search history.

(56) References Cited

U.S. PATENT DOCUMENTS

| | | | | |
|---|---|---|---|---|
| 4,295,067 A | * | 10/1981 | Binder et al. .................. 310/52 |
| 4,533,580 A | * | 8/1985 | Otty ........................... 428/34.2 |
| 5,936,326 A | | 8/1999 | Umeda et al. |
| 5,952,749 A | | 9/1999 | Umeda et al. |
| 5,955,810 A | | 9/1999 | Umeda et al. |
| 5,965,965 A | | 10/1999 | Umeda et al. |
| 5,982,068 A | | 11/1999 | Umeda et al. |
| 5,986,375 A | | 11/1999 | Umeda et al. |
| 5,994,813 A | | 11/1999 | Umeda et al. |
| 5,998,903 A | | 12/1999 | Umeda et al. |
| 6,011,332 A | | 1/2000 | Umeda et al. |
| 6,020,669 A | | 2/2000 | Umeda et al. |
| 6,051,906 A | | 4/2000 | Umeda et al. |
| 6,091,169 A | | 7/2000 | Umeda et al. |
| 6,097,130 A | | 8/2000 | Umeda et al. |
| 6,124,660 A | | 9/2000 | Umeda et al. |
| 6,137,201 A | | 10/2000 | Umeda et al. |
| 6,144,136 A | | 11/2000 | Umeda et al. |
| 6,147,432 A | * | 11/2000 | Kusase et al. ............... 310/260 |
| 6,181,043 B1 | | 1/2001 | Kusase et al. |
| 6,181,045 B1 | | 1/2001 | Umeda et al. |
| 6,191,508 B1 | * | 2/2001 | Aoki et al. .................... 310/45 |

(Continued)

FOREIGN PATENT DOCUMENTS

JP    A 2000-69729    3/2000

(Continued)

*Primary Examiner*—Thanh Lam
(74) *Attorney, Agent, or Firm*—Oliff & Berridge, PLC

(57) ABSTRACT

In a rotary electric machine, at least one of first and second ends of each conductor segment is at least partially joined to at least one of the first and second ends of a corresponding another one of the conductor segments to provide the stator winding including a plurality of joint portions of the plurality of conductor segments. An insulating film covers each of the conductor segments except for at least the joint portions of the stator winding. At least part of the insulating film of each of the conductor segments located close to a corresponding one of the joint portions contains an evaporatable component. An amount in ppm of the evaporatable component contained in the at least part of the insulating film is adjusted to be equal to or lower than 20000 ppm.

15 Claims, 11 Drawing Sheets

U.S. PATENT DOCUMENTS

| | | |
|---|---|---|
| 6,198,190 B1 | 3/2001 | Umeda et al. |
| 6,200,405 B1 * | 3/2001 | Nakazawa et al. .......... 156/248 |
| 6,204,586 B1 * | 3/2001 | Umeda et al. ............... 310/179 |
| 6,291,918 B1 | 9/2001 | Umeda et al. |
| 6,459,177 B1 * | 10/2002 | Nakamura et al. .... 310/216.136 |
| 6,459,186 B1 | 10/2002 | Umeda et al. |
| 6,492,757 B2 * | 12/2002 | Nakamura et al. .......... 310/180 |
| 6,501,206 B2 * | 12/2002 | Oohashi et al. ............. 310/184 |
| 6,552,463 B2 * | 4/2003 | Oohashi et al. ............. 310/207 |
| 7,018,483 B2 * | 3/2006 | Thoustrup .................... 134/19 |
| 7,038,346 B2 * | 5/2006 | Koike ......................... 310/184 |

FOREIGN PATENT DOCUMENTS

| | | |
|---|---|---|
| JP | A 2005-304223 | 10/2005 |

\* cited by examiner

① (INNERMOST LAYER)  ③ (OUTER MIDDLE LAYER)
② (INNER MIDDLE LAYER)  ④ (OUTERMOST LAYER)

ROTARY ELECTRIC MACHINE AND STATOR FOR ROTARY ELECTRIC MACHINES

CROSS REFERENCE TO RELATED APPLICATIONS

This application is based on Japanese Patent Application 2006-233881 filed on Aug. 30, 2006. This application claims the benefit of priority from the Japanese Patent Application, so that the descriptions of which are all incorporated herein by reference.

FIELD OF THE INVENTION

The present invention relates to rotary electric machines installable in, for example, vehicles, such as passenger automobiles and trucks, and to stators for rotary electric machines.

BACKGROUND OF THE INVENTION

Rotary electric machines for vehicles, such as engine-driven alternators, need to have a high power output in order to achieve reduction in the idling engine speed of a vehicle as an environmental measure. They also need to be reduced in size and weight in order to implement weight reduction of a vehicle for improvement its fuel efficiency and reduction in the width of the engine compartment for finding room therein.

For meeting the needs, some types of alternators are designed such that each of multiphase windings of a stator is made up of a plurality of conductor segments inserted in slots of the stator. One end of each of the conductor segments projecting one of the slots is sequentially welded to the other end of a corresponding one of the conductor segments projecting a corresponding another one of the slots so that the sequentially joined conductor segments provide radially layered annular windings. The configuration of each of the multiphase windings allows high density of the multiphase windings and low resistance therein.

An example of some types of alternators set forth above is disclosed in Publication U.S. Pat. No. 5,936,326 corresponding to Japanese Unexamined Patent Publication No. 2000-69729.

On the other hand, foreign particles, such as dust particles, electrolyte components including salt-water components, car shampoo components, and the like, may enter the engine compartment of a vehicle in which an alternator is to be installed. It is necessary for the alternator installed in the engine compartment to keep its proper output characteristics even under such an environment.

Particularly, because an alternator for vehicles is designed to be cooled by a fan installed therein, cooling air generated by the fan may cause foreign particles, such as dust particles and/or electrolyte components, to likely enter the inside of the alternator together therewith. For this reason, it is important to reliably ensure environment resistance of the stator.

SUMMARY OF THE INVENTION

In each of the multi-phase windings of the alternator disclosed in the Patent Publication, one end of each of the conductor segments and the other end of a corresponding one of the conductor segments are joined to each other by welding. This may cause the joint portions of the conductor segments and their surroundings to become high in temperature.

For example, it is assumed that the joint portions of each of the multiphase windings are only exposed and the remaining portions thereof are coated with an insulating film.

In this assumption, an insulating film coated at a portion of a conductor of one of the multiphase windings, which is close to the corresponding one of the joint portions, may deteriorate by thermal stress applied while the corresponding one of the joint portions is formed by welding. This may cause peeling off or cracking of the deteriorated insulating film, resulting that the foreign particles, such as dust particles, electrolyte components, and the like, may enter the gaps formed due to the peeling-off or cracking and stay there. This may cause defective insulation in the one of the multiphase windings.

In addition, the joint portions of each of the multiphase windings can be coated with an additional insulating film. In this case, however, an insulating film coated at a joint portion of a multiphase winding may deteriorate by thermal stress applied while the joint portion is formed by welding. This may cause peeling off or cracking of the deteriorated insulating film, resulting that the foreign particles, such as dust particles, electrolyte components, and the like, may enter the gaps formed due to the peeling-off or cracking and stay there.

In order to improve electrical isolation, each of the insulating-film coated joint portions of each of the multiphase windings can be further coated with a resin material. In this case, however, when an insulating film coated at a joint portion of a multiphase winding may be peeled off or cracked by thermal stress applied while the joint portion is formed by welding, the resin material may be difficult to be adhered onto the joint portion. This may deteriorate the environment resistance of the stator.

Accordingly, an object of at least one aspect of the present invention is to provide rotary electric machines and stators therefor. These rotary electric machines and stators therefor are capable of preventing foreign particles, such as dust particles, electrolyte components, and the like, from staying at a portion of a winding thereof; this portion is close to a joint portion of at least two conductor segments constituting the winding.

According to one aspect of the present invention, there is provided a rotary electric machine includes a rotor supported in a frame of the machine to be rotatable about an axis, and a stator disposed in the frame and opposing the rotor. The stator includes a stator core, and a stator winding installed in the stator core and composed of a plurality of conductor segments each with a length. Each of the conductor segments has first and second ends in a direction of the length thereof. At least one of the first and second ends of each of the conductor segments is at least partially joined to at least one of the first and second ends of a corresponding another one of the conductor segments to provide the stator winding including a plurality of joint portions of the plurality of conductor segments. The stator also includes an insulating film covering each of the plurality of conductor segments except for at least the joint portions of the stator winding. At least part of the insulating film of each of the conductor segments located close to a corresponding one of the joint portions contains an evaporatable component. An amount in ppm of the evaporatable component contained in the at least part of the insulating film is adjusted to be equal to or lower than 20000 ppm.

According to another aspect of the present invention, there is provided a stator to be disposed opposing a rotor of a rotary electric machine. The stator includes a stator core, and a stator winding installed in the stator core and composed of a plurality of conductor segments each with a length. Each of the conductor segments has first and second ends in a direction of the length thereof. At least one of the first and second ends of each of the conductor segments is at least partially joined to at least one of the first and second ends of a corresponding another one of the conductor segments to provide the stator winding including a plurality of joint portions of the plurality of conductor segments. The stator also includes an insulating film covering each of the conductor segments except for at least the joint portions of the stator winding. At least part of the insulating film of each of the conductor segments located close to a corresponding one of the joint portions contains an evaporatable component. An amount in ppm of the evaporatable component contained in the at least part of the insulating film is adjusted to be equal to or lower than 20000 ppm.

According to a further aspect of the present invention, there is provided a method of adjusting an amount of an evaporatable component contained in at least part of an insulating film. The insulating file coats each of a plurality of conductor segments of a stator winding except for a plurality of joint portions of the stator winding. Each of the plurality of conductor segments has a length and having first and second ends in a direction of the length thereof. The plurality of joint portions are formed by at least partially joining at least one of the first and second ends of each of the conductor segments to at least one of the first and second ends of a corresponding another one of the conductor segments. The at least part of the insulating film of each of the conductor segments is located close to a corresponding one of the joint portions. The method includes measuring an amount in ppm of an evaporatable component contained in the insulating film, and vaporizing part of the evaporatable component contained in the insulating film while repeatedly checking the measured amount in ppm of the evaporatable component contained in the insulating film.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
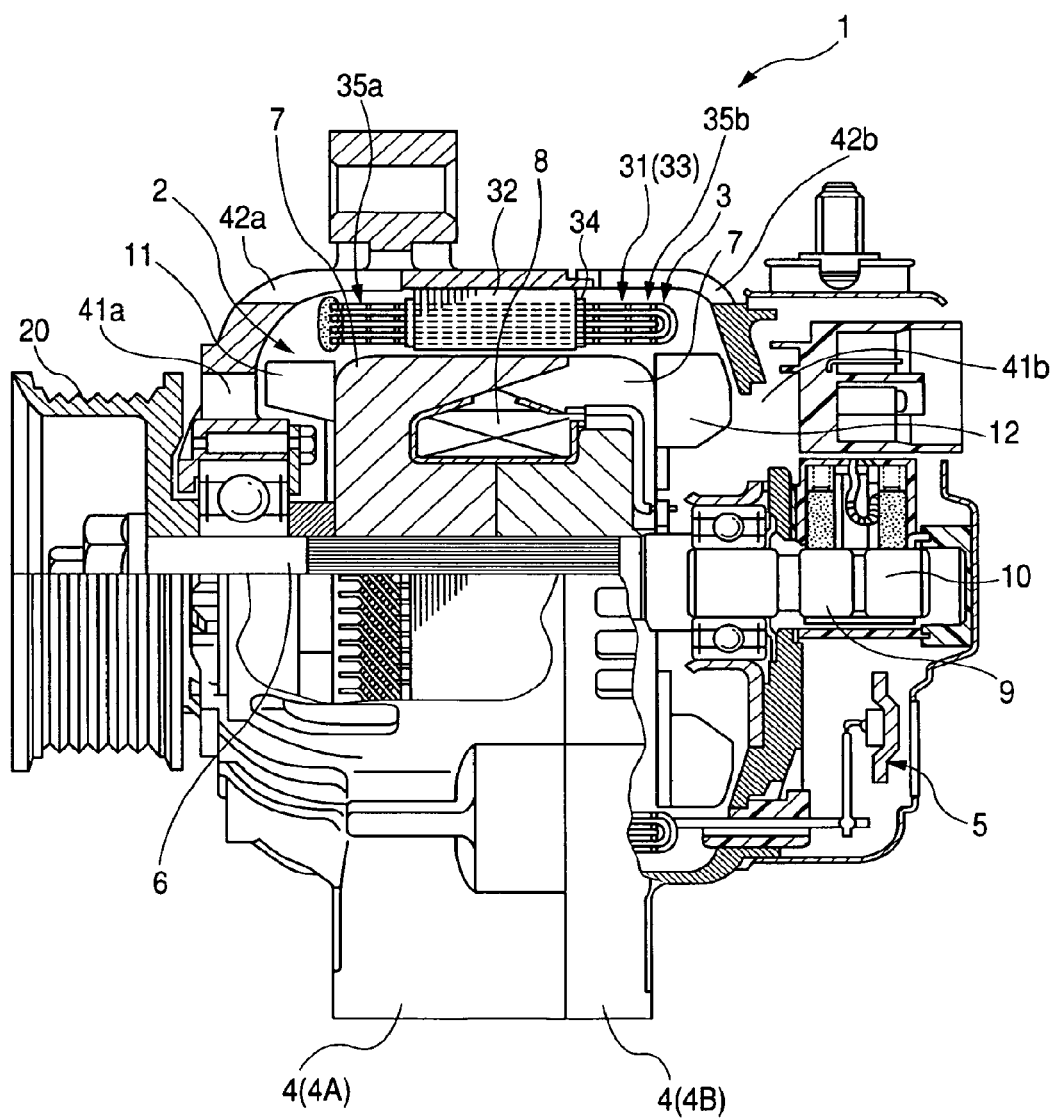
FIG. 1 is a partially axial sectional view illustrating an alternator according to an embodiment of the present invention.

Referring to the drawings, in which like reference characters refer to like parts in several views, particularly to FIG. 1, there is illustrated an alternator 1 for vehicles, as an example of rotary electric machines.

The alternator 1 installed in, for example, an engine compartment of a vehicle includes a rotor 2, a stator 3, a frame 4, a rectifier 5, a voltage regulator (not shown), and so on.

The rotor 2 is attached to a rotary shaft 6 rotatably supported in the frame 4 by bearings so that it is disposed within the frame 4. One end of the rotary shaft 6 is linked to a pulley 20 such that the rotary shaft 6 is rotatably driven through the pulley 20 by an engine (not shown) installed in the engine compartment.

Specifically, the rotor 2 is composed of a Lundell type (claw pole) core 7. The pole core 7 has a pair of opposing circuit plates axially assembled to the rotary shaft 6 and a number of, for example, six claw portions extending from the outer peripheral side of each of the circular plates. The claw portions of one of the circuit plates and those of the other thereof are alternatively arranged in the circumferential direction of the rotor 2.

The rotor 2 is also composed of a field coil 8, slip rings 9 and 10, and brushes. The field coil 8 consists of an insulating-film-coated copper wire and is so mounted between the circular plates of the pole core 7 as to be concentrically wound around the rotary shaft 6 in the form of a cylinder. The slip rings 9 and 10 and the brushes are configured to provide electrical connections between the field coil 8 and a power supply (battery).

The rotor 2 is also composed of a cooling fan 11 and a centrifugal cooling fan 12 respectively mounted on external end surfaces of the circular plates of the pole core 7 by, for example, welding. The alternator 1 is arranged in the engine compartment such that the one end of the rotary shaft 6 linked to the pulley 20 is directed to the front side of the vehicle.

The cooling fan 11 serves as an axial flow fan. Specifically, when being rotated with rotation of the pole core 7, the cooling fan 11 works to inhale cooling air from the front side of the vehicle into the frame 4, deliver the inhaled cooling air in the axial direction of the rotary shaft 6 and in radial directions thereof, and exhaust the delivered cooling air from the frame 4.

When being rotated with the rotation of the pole core 7, the centrifugal fan 12 works to inhale cooling air from the rear side of the vehicle into the frame 4, deliver the inhaled cooling air in the radial direction of the rotary shaft 6, and exhaust the delivered cooling air from the frame 4.

The stator 3 is composed of a stator core 32 fixed to an inner peripheral wall of the frame 4.

Figure 3:
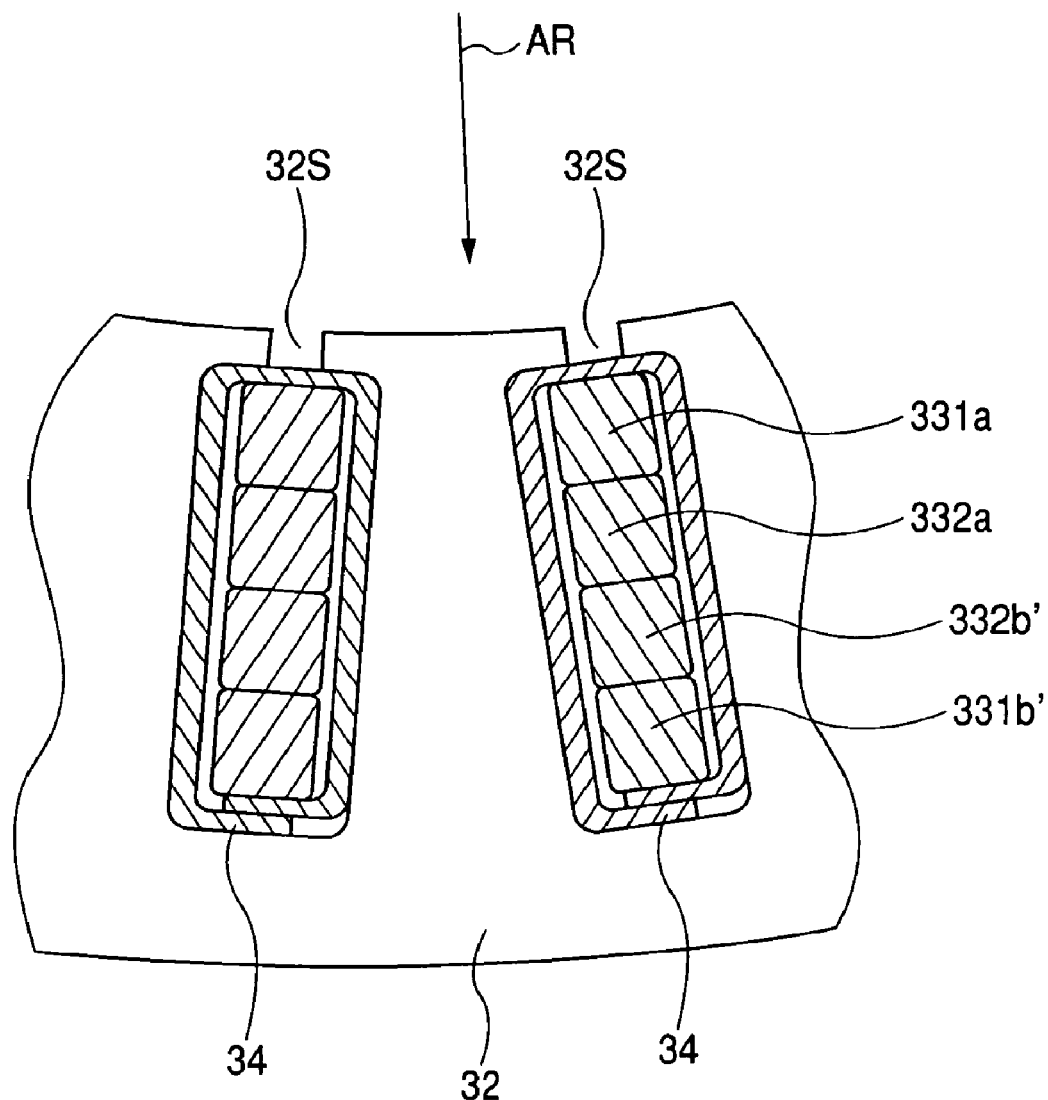
FIG. 3 is a partially cross sectional enlarged view schematically illustrating part of the stator according to the embodiment.

The stator core 32 is formed by, for example, laminating a plurality of ring steel plates so that it has, for example, a substantially annular shape and first and second annular axial end surfaces. The stator core 32 also has a plurality of groove-like slots 32S (see FIG. 3 hereinafter) formed on an inner wall surface of the stator core 32.

The slots 32S are formed through the stator core 32 in its axial direction (length direction) and are circumferentially arranged at given intervals. The circumferential interval of adjacent slots 32S defines a slot pitch corresponding to an electric angle of, for example, π/6 radian. Each of the slots 32S has a predetermined length in a radial direction of the stator core 32.

The stator 3 is also composed of a stator coil 31 consisting of three-phase windings connected in star or delta configuration as an example of single-phase or multi-phase windings. Each of the three-phase windings consists of a plurality of conductor segment units 33. The conductor segment units 33 are inserted in the slots 32S of the stator core 32. The stator core 32 further has insulators 34 inserted between the conductor segment units 33 disposed in the slots 32S and inner peripheral surfaces of the slots 32S to insulate therebetween.

The stator coil 31 has first and second coil end portions 35a and 35b axially opposed to each other and projecting from the first and second axial end surfaces of the stator core 32 toward the front and rear sides of the vehicle, respectively. For example, ends of the conductor segment units 33 of the stator coil 31 are drawn out from, for example, the first coil end portion 35a of the stator coil 31. Further details on the stator coil 31 will be described hereinafter.

The frame 4 is configured to accommodate the rotor 2 and the stator 3 such that the stator core 32 is fixedly disposed around the outer periphery of the pole core 7 in which the inner periphery of the stator core 32 is opposite to the outer periphery of the pole core 7 with a predetermined air gap.

Specifically, the frame 4 is composed of a front frame 4A and a rear frame 4B, which are fastened to each other by a plurality of fastening bolts. This fastening structure fixedly supports the stator 3 in the frame 4.

The front frame 4A is formed with a plurality of intake windows 41a disposed opposing the cooling fan 11 so that cooling air can be inhaled into the frame 4 from the front side thereof.

Similarly, the rear frame 4B is formed with a plurality of intake windows 41b disposed opposing the centrifugal fan 12 so that cooling air can be inhaled into the frame 4 from the rear side thereof.

The front frame 4A is also formed with a plurality of discharge windows 42a. The discharge windows 42a are disposed opposing the coil end 35a so that the inhaled cooling air can be discharged therethrough out of the frame 4 (alternator 1).

Similarly, the rear frame 4B is also formed with a plurality of discharge windows 42b. The discharge windows 42b are disposed opposing the coil end 35b so that the inhaled cooling air can be discharged therethrough out of the frame 4 (alternator 1).

The rectifier 5 is composed of a number of, for example, six, rectifying elements, such as rectifying diodes in full-bridge configuration.

The rectifier 5 is electrically connected to three output leads extending from the ends of the conductor segment units 33 of the three-phase windings of the stator coil 31 drawn out from the first coil end portion 35a thereof.

The rectifier 5 is configured to convert a three-phase AC (Alternating Current) voltage applied from the three-phase windings of the stator coil 31 into a DC voltage using both positive and negative half cycles of the three-phase AC voltage. The DC voltage is configured to be output from the alternator 1 via the output terminal thereof as an output voltage.

Specifically, in the alternator 1 set forth above, a field current is applied to the field coil 8 through the slip rings 9 and 10 and the brushes while the field coil 8 of the rotor 2 is rotating based on torque applied from the engine through the pulley 20. In this situation, the field current flowing through the field coil 8 magnetizes the claw portions of one of the circuit plates to the north (N) pole, and those of the other thereof to the south (S) pole. The rotation of the alternately magnetized north and south poles create magnetic fluxes, and the created magnetic fluxes induce a three-phase AC voltage in the stator coil 31. The induced three-phase AC voltage is full-wave rectified by the rectifier 5, thereby generating the DC voltage (output voltage). The voltage regulator is configured to control the field current flowing through the field coil 8 depending on the alternator output voltage.

Next, the stator 3 will be described in detail hereinafter.

Figure 2:
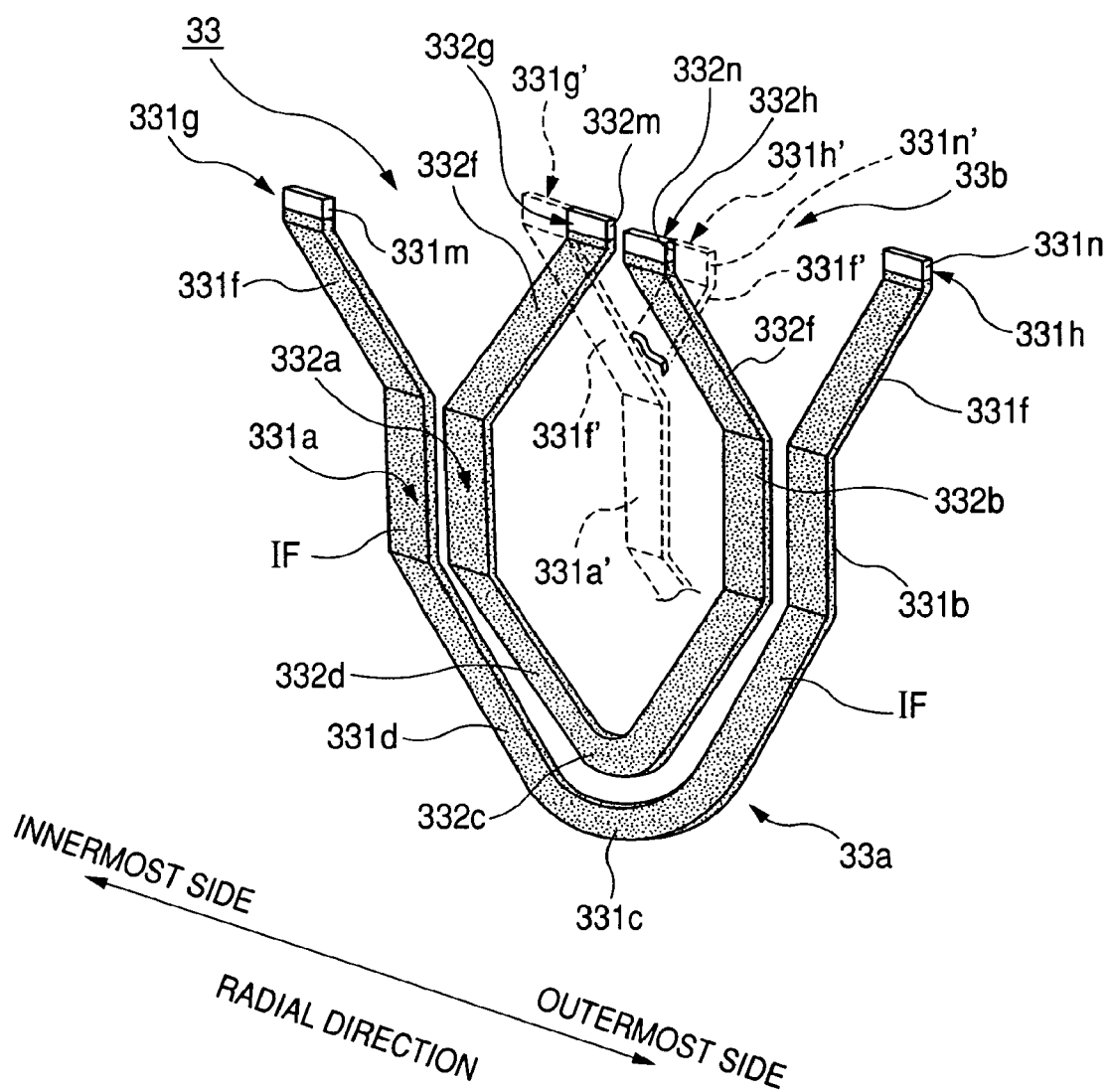
FIG. 2 is an enlarged perspective view of a conductor segment unit consisting of large and small conductor segments constituting each of three-phase windings of a stator coil installed in a stator of the alternator according to the embodiment.

As illustrated in FIG. 2, each of the three-phase windings of the stator coil 31 is made up of the plurality of conductor segment units 33 each serving as a basic conductor segment unit.

Each of the conductor segment units (basis segment units) 33 consists of a pair of a large conductor segment 33a and a small conductor segment 33b each with a substantially rectangular shape in its lateral cross section.

The large conductor segment 33a is composed of a pair of straight portions 331a and 331b, and a U- or V-shaped turn portion 331c. The paired straight portions 331a and 331b having their one ends and continuously extending from ends of the turn portion 331c are to be inserted into the corresponding slots 32S.

The large conductor segment 33a is also composed of inclined portions (legs) 331f continuing from the other ends of the straight portions 331a and 331b.

The inclined portions 331f project outside the corresponding slots 32S when the straight portions 331a and 331b are placed within the corresponding slots 32S so as to be outwardly bent with a predetermined electric angle with respect to the axial direction of the corresponding slots 32S.

The inclined portions 331f have respective tip ends 331g and 331h to be welded. The tip ends 331g and 331h are bent from the respective projective ends of the inclined portions 331f to extend in the axial direction of the stator core 32.

The turn portion 331c of the large conductor segment 33a is composed of a tip portion and a pair of slant portions 331d. The paired slant portions 331d are designed to continue from both ends of the tip portion, slant with a predetermined electric angle with respect to the axial direction of the corresponding slots 32, and lead to the straight portions 331a and 331b, respectively.

Similarly, the small conductor segment 33b is composed of a pair of straight portions 332a and 332b, and a U- or V-shaped turn portion 332c. The paired straight portions 332a and 332b having their one ends and continuously extending from ends of the turn portion 332c are to be inserted into the corresponding slots 32S.

The small conductor segment 33b is also composed of inclined portions (legs) 332f continuing from the other ends of the straight portions 332a and 332b.

The inclined portions 332f project outside the corresponding slots 32S when the straight portions 332a and 332b are placed within the corresponding slots 32S so as to be inwardly bent with a predetermined electric angle with respect to the axial direction of the corresponding slots 32S.

The inclined portions 332f have respective tip ends 332g and 332h to be welded. The tip ends 332g and 332h are outwardly bent from the respective projective ends of the inclined portions 332f to extend in the axial direction of the stator core 32.

The turn portion 332c of the small conductor segment 332 is composed of a tip portion and a pair of slant portions 332d. The paired slant portions 332d are designed to continue from both ends of the tip portion, slant with a predetermined electric angle with respect to the axial direction of the corresponding slots 32S, and lead to the straight portions 332a and 332b, respectively.

The inclined portions 331f and 332f projecting from the corresponding slots 32S through the first axial end surface side (front side) of the stator core 32 provide the first coil end portion 35a.

The turn portions 331c and 332c projecting from the corresponding slots 32S through the second axial end surface side (rear side) of the stator core 32 provide the second coil end portion 35b.

In the embodiment, the large conductor segment 33a is covered with an insulating film IF except for its corresponding ends 331g and 331h by, for example, baking. Similarly, the small conductor segment 33b is covered with an insulating film IF except for its corresponding ends 332g and 332h, by, for example, baking.

In the embodiment, an even number, such as four, of the straight portions are inserted in each slot 32S. Four straight portions being disposed in one of the slots 32S are aligned in the radial direction and respectively disposed in an innermost layer, an inner middle layer, an outer middle layer, and an outermost layer from the inner periphery of each slot 32S (see FIG. 3).

Figure 4:
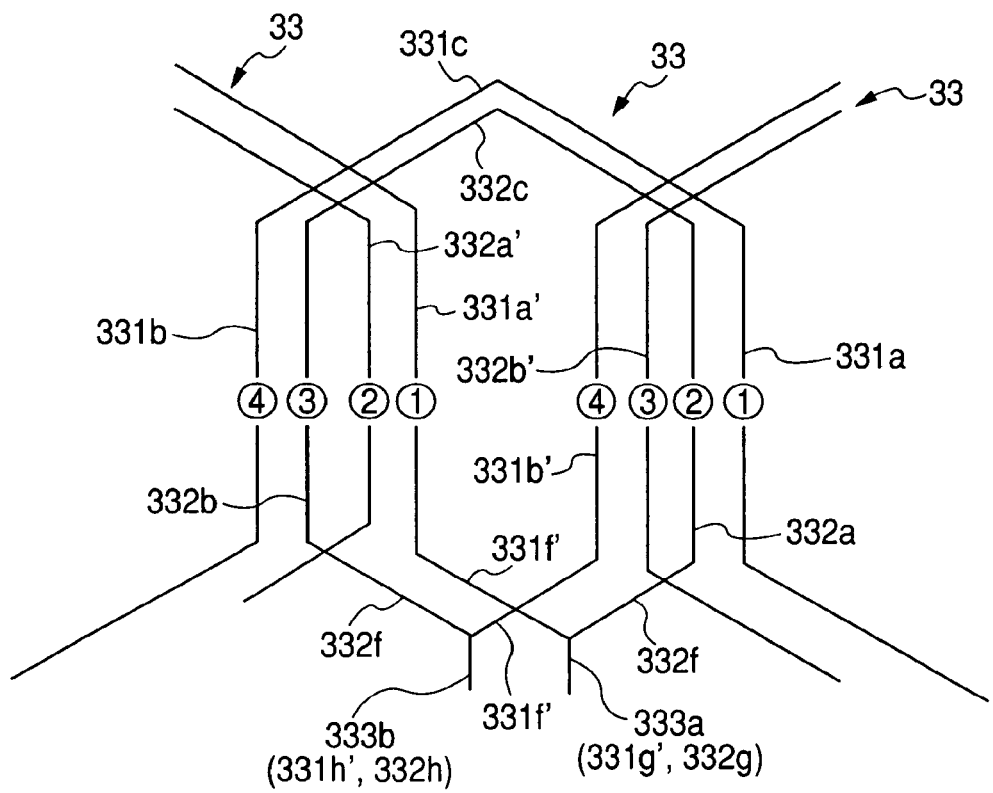
FIG. 4 is an enlarged winding diagram development of part of the stator coil according to the embodiment.

As illustrated in FIG. 4, a straight portion 331a (①) disposed in the innermost layer of one of the slots 32S is paired with a straight portion 331b (④) disposed in the outermost layer of another slot 32S that is circumferentially spaced apart from the one of the slots 32S by one pole pitch (six slot pitches) in, for example, clockwise direction.

Similarly, a straight portion 332a (②) disposed in the inner middle layer of one of the slots 32S is paired with a conductor member 332b (③) disposed in the outer middle layer of another slot 32S that is circumferentially spaced apart from the one of the slots 32S by one pole pitch in clockwise direction.

The paired conductor members 331a and 331b are connected to each other by a corresponding turn portion 331c at the second axial end surface side (rear side) of the stator core 32.

The paired straight portions 332a and 332b are also connected to each other by a corresponding turn portion 332c at the second axial end surface side (rear side) of the core 32.

The straight portion 332a arranged in the inner middle layer of one of the slots 32S is paired with a straight portion 331a' arranged in the innermost layer of another slot 332S that is one pole pitch clockwise spaced apart from the one of the slots 32S.

Similarly, the straight portion 331b' arranged in the outermost layer of one of the slots 32S is also paired with a straight portion 332b arranged in the outer middle layer of another slot 32S that is one pole pitch clockwise spaced apart from the one of the slots 32S. Junctions between the paired conductor members are disposed at the first axial end surface side (front side) of the stator core 32.

As illustrated in FIGS. 2 to 5, each reference number with no dash and that with a dash (') are assigned to the identical portions of different conductor segment units 33 (conductor segments 33a and 33b).

Specifically, as illustrated in FIGS. 2 to 5, a tip end 332h of an inclined portion 332f extending from a straight portion 332b inserted in the outer middle layer of one of the slots 32S has a pair of lateral side surfaces 332n opposing to each other, and a pair of longitudinal side surfaces 332y opposing to each other; these longitudinal side surfaces 332y are radially aligned.

A tip end 331h' of an inclined portion 331f' extending from a straight portion 331b' inserted in the outermost layer of the one of the slots 32S has a pair of lateral side surfaces 331n' opposing to each other, and a pair of longitudinal side surfaces 331y' opposing to each other; these longitudinal side surfaces 331y' are radially aligned.

A tip end 332g of an inclined portion 332f extending from a straight portion 332a inserted in the inner middle layer of one of the slots 32S has a pair of lateral side surfaces 332m opposing to each other, and a pair of longitudinal side surfaces 332x opposing to each other; these longitudinal side surfaces 332x are radially aligned.

A tip end 331g' of an inclined portion 331f' extending from a straight portion 331a' inserted in the innermost layer of the one of the slots 32S has a pair of lateral side surfaces 331m' opposing to each other, and a pair of longitudinal side surfaces 331x' opposing to each other; these longitudinal side surfaces 331x' are radially arranged.

Figure 5:
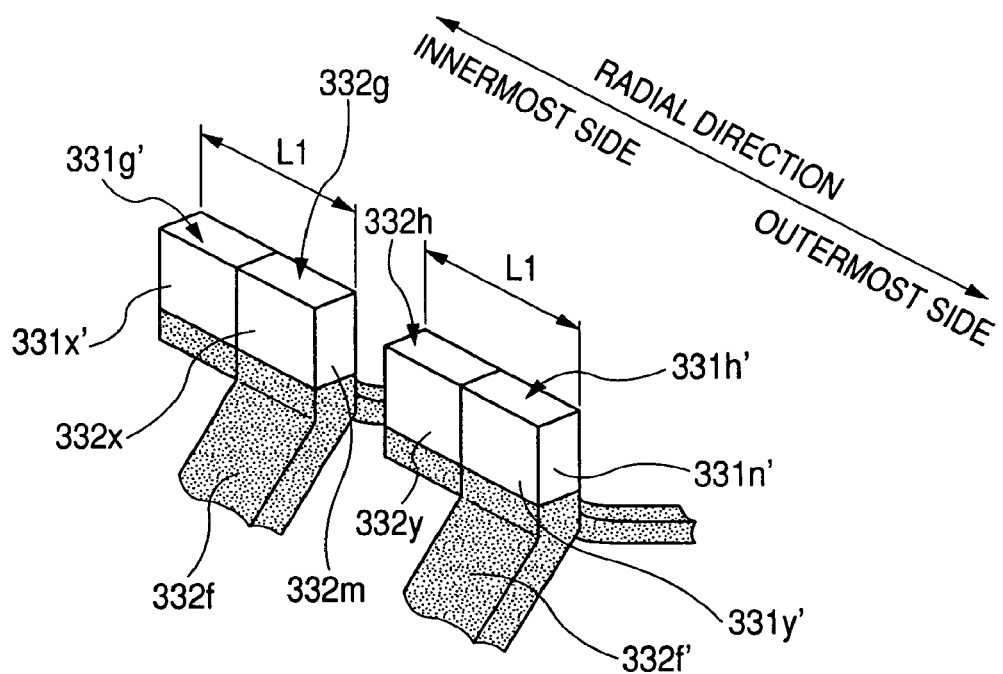
FIG. 5 is an enlarged perspective view of two pairs of tip ends of the large and small conductor segments according to the embodiment.

In the stator 3 according to the embodiment, the tip end 332h and the tip end 331h' are arranged such that one of the paired lateral side surfaces 332n and one of the paired lateral side surfaces 331n' opposing to each other are adjacently contacted to each other in a radial direction of the stator core 32 (see FIG. 5).

Similarly, the tip end 332g and the tip end 331g' are arranged such that one of the paired lateral side surfaces 332m and one of the paired lateral side surfaces 331m' opposing to each other are adjacently contacted to each other in a radial direction of the stator core 32 (see FIG. 5).

In this state, the tip end 332h and the tip end 331h' are joined to each other by, for example, Tungsten Inert Gas welding (TIG welding). Similarly, the tip end 332g and the tip end 331g' are joined to each other by, for example, TIG welding.

Specifically, after the tip end 332h and the tip end 331h' are adjacently contacted to each other (see FIG. 5), a non-consumable tungsten electrode is arranged close to the contact portion between the tip end 332h and the tip end 331h'. When energized, the tungsten electrode allows an arc to be formed between the tungsten electrode and the contact portion, melting the contact portion. Thereafter, the melted contact portion is hardened again, thus providing a droplet joint portion 333b as a melt bead.

As in the case of joining the tip end 332h and the tip end 331h', after the tip end 332g and the tip end 331g' are adjacently contacted to each other (see FIG. 5), the non-consumable tungsten electrode is arranged close to the contact portion between the tip end 332g and the tip end 331g'. When energized, the tungsten electrode allows an arc to be formed between the tungsten electrode and the contact portion, melting the contact portion. Thereafter, the melted contact portion is hardened again, thus providing a droplet joint portion 333a as a melt bead.

The joint portion 333b and the joint portion 333a are radially arranged such that the joint portion 333b is located outside of the joint portion 333a.

Because each of the joint portions 333a and 333b is melted by the TIG welding to become a droplet, it has a radially longitudinal length L2 longer than a radially longitudinal length L1 of each of the contact portion (332h, 331h') and the contact portion (332g, 331g').

Figure 6:
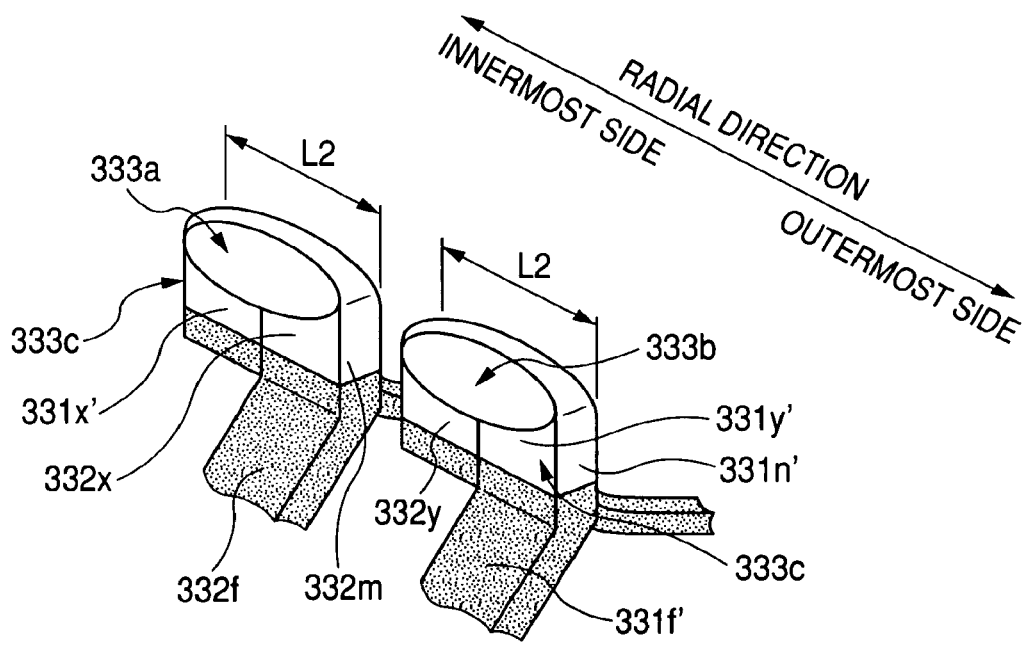
FIG. 6 is an enlarged perspective view of joint portions of the respective paired tip ends of the large and small conductor segments according to the embodiment.

In addition, as illustrated in FIGS. 5 and 6, a portion (bare portion) 333c of the tip end of each of the large and small conductor segments 33a and 33b, which is uncovered with the insulating film IF and is close to the corresponding joint portion, is located to be limited within the axially extending region of the corresponding tip end. In other words, the bare portion 333c of each of the large and small conductor segments 33a and 33b, which is uncovered with the insulating film IF, is limited without extending to the corresponding inclined portions.

In the embodiment, as illustrated in FIGS. 5 and 6, the longitudinal and lateral side surfaces 331x and 331m of the tip end 331g and the longitudinal and lateral side surfaces 331y and 331n of the tip end 331h of the large conductor segment 33a are preferably formed to be flat. Similarly, the longitudinal and lateral side surfaces 332x and 332m of the tip end 332g and the longitudinal and lateral side surfaces 332y and 332n of the tip end 332h of the small conductor segment 33b are preferably formed to be flat.

One of the flat lateral side surfaces 331m of the tip end 331g of each of the large conductor segments 33a and one of the flat lateral side surfaces 332m of the tip end 332g of a corresponding one of the small conductor segments 33b, which are to be joined to each other, allow the joint stability therebetween to increase.

The other of the flat lateral side surfaces 331m of the tip end 331g of each of the large conductor segments 33a allows a space with respect to an inner periphery of the stator core 32 to be secured. The other of the flat lateral side surfaces 332m of the tip end 332g of each of the small conductor segments 33b allows a space with respect to the joint portion 333b and the bare portion 333c of the tip ends 331h and 332h radially adjacent to the flat side surface 332m to be secured.

The flat longitudinal side surfaces 331x of the tip end 331g and the flat longitudinal side surfaces 332x of the tip end 332g of a joint portion 333a allow spaces with respect to other joint portions and the bare portion 333c located adjacent thereto in the circumferential direction to be secured. Similarly, the flat longitudinal side surfaces 331y of the tip end 331h and the flat longitudinal side surfaces 332y of the tip end 332h of a joint portion 333b allow spaces with respect to other joint portions located adjacent thereto in the circumferential direction to be secured.

These secured spaces make it possible for the stator 1 to reduce the risk of a short-circuit, and improve its cooling capability and its environment resistance.

Figure 7:
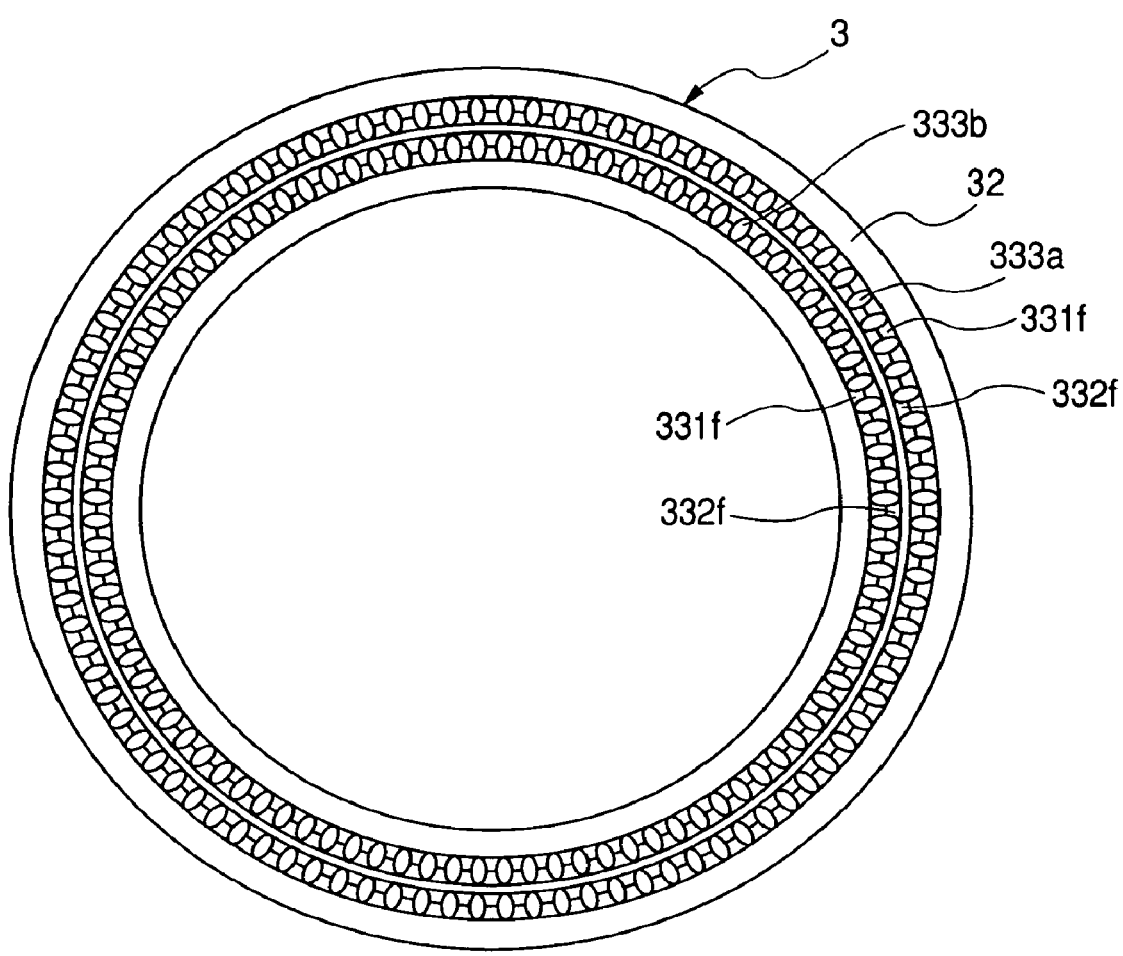
FIG. 7 is a plan view of the stator viewed from a first axial end surface side of the stator.

The tip ends 331g and 331h of all of the large conductor segments 33a and the tip ends 332g and 332h are welded to each other in the same manner described above and illustrated in FIGS. 5 and 6. This makes it possible to, as illustrated in FIG. 7, provide two radially-adjacent conductor-joint layers. The two radially-adjacent conductor-joint layers are so arranged on different concentric circles, respectively, as to provide a ring clearance therebetween.

Figure 8:
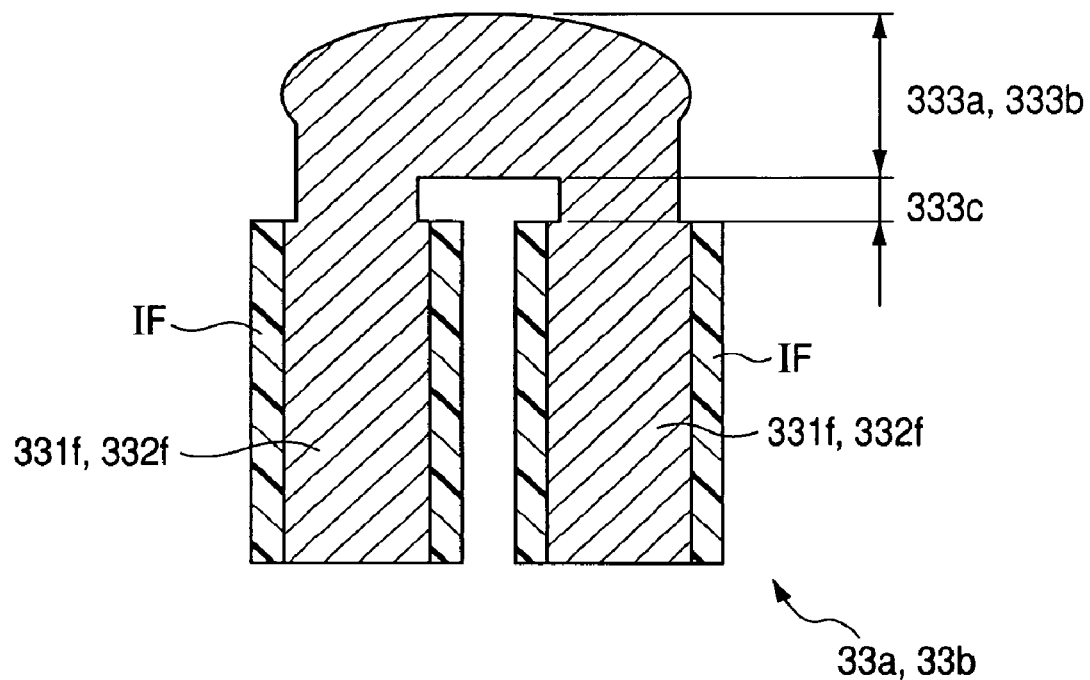
FIG. 8 is a partially cross sectional enlarged view schematically illustrating a state of an insulating film covering a large conductor segment or small conductor segment except for the joint portion and a bare portion according to the embodiment.
Figure 9:
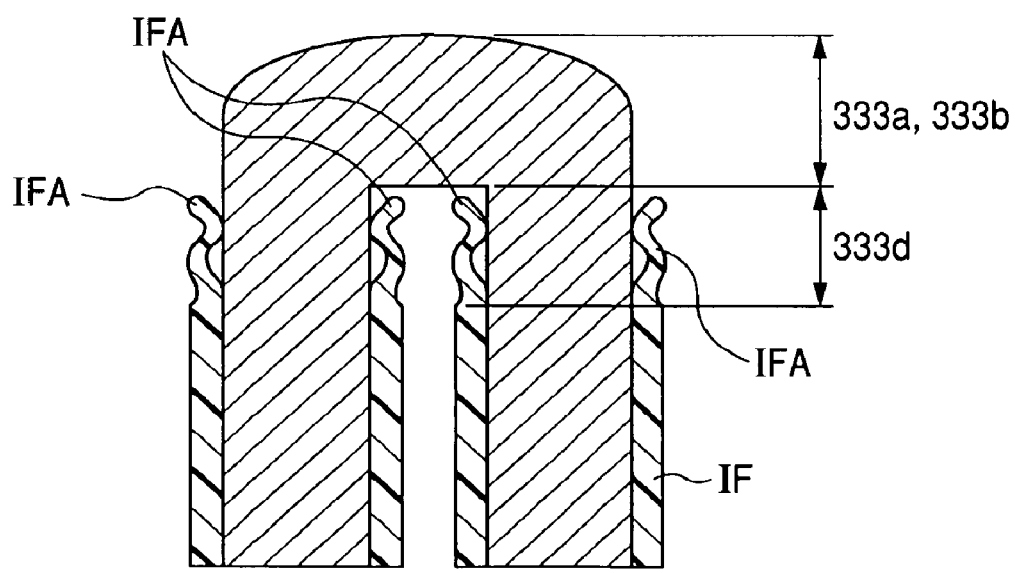
FIG. 9 is a partially cross sectional enlarged view schematically illustrating a state of an insulating film covering a large conductor segment or small conductor segment except for the joint portion and a bare portion according to a comparison example of the embodiment.

FIG. 8 schematically illustrates the state of the insulating film IF covering a large conductor segment 33a or small conductor segment 33b except for the joint portion 333a or 333b and the bare portion 333c according to the embodiment. FIG. 9 schematically illustrates the state of an insulating film IFA covering a large conductor segment 33a or small conductor segment 33b except for the joint portion 333a or 333b and the bare portion 333c according to a comparison example of the embodiment.

As illustrated in FIG. 9, if part of the insulating film IF covering a large or small conductor segment 33a or 33b is removed from only a minimum area required for welding (TIG welding), an end IFA of the insulating film IF covering a portion 333d of a corresponding tip end close to the corresponding joint portion 333a or 333b may be jacked or blistered to deteriorate by thermal stress applied while a corresponding joint portion 333a or 333b is formed by welding (TIG welding).

The reason why the deterioration of the insulating film IF occurs is as follows.

Specifically, as set forth above, the contact portion between one tip end of a large conductor segment 33a and a corresponding one tip end of a small conductor segment 33b and a portion close thereto become high in temperature while the contact portion is heated by welding. This may cause evaporatable components contained in the insulating film IF, such as moisture contents and/or solvent components, to abruptly vaporize. Note that the moisture contents may be absorbed into the insulating film IF, and the solvent components may remain in the insulating film IF after baking.

Specifically, the vaporization of the evaporatable components may generate gas bubbles thereof. The generated gas bubbles may jack part of the insulating film IF from the conductor segment, and/or cause part of the insulating film IF to be blistered.

However, in the embodiment, adjusting the volume of evaporatable components contained in the insulating film IF permits deterioration of the insulating film IF to be retarded.

Figure 10:
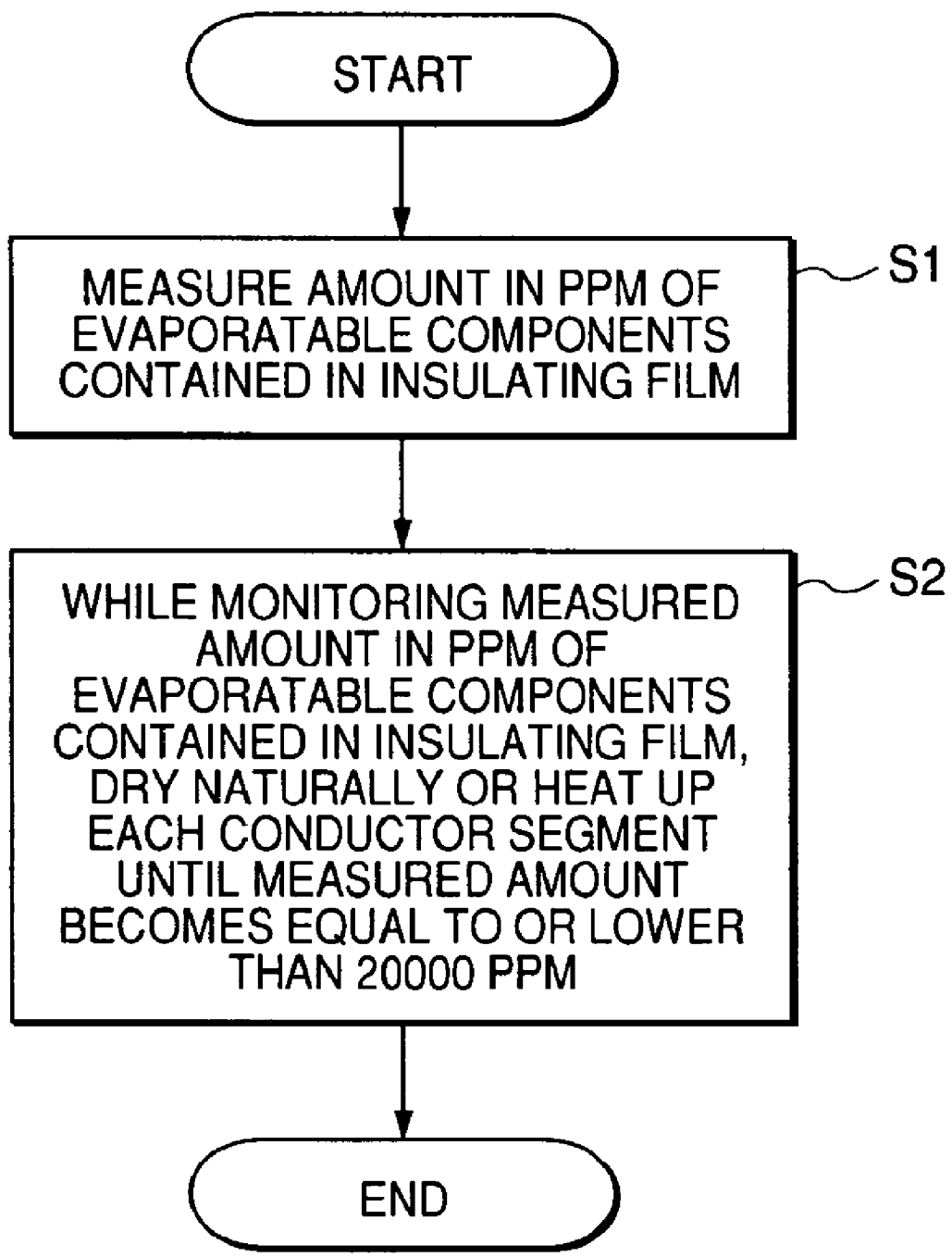
FIG. 10 is a flowchart schematically illustrating how to adjust the amount of evaporatable components contained in the insulating file covering a conductor segment according to the embodiment.

Specifically, in the embodiment, after each of the conductor segments 33a and 33b is covered with the insulating film IF, the amount in ppm (parts per million) of evaporatable components contained in the insulating film IF is continuously or periodically measured by use of the Karl Fischer Method in step S1 of FIG. 10.

Note that the Karl Fischer Method is configured to use Karl Fischer reagent, which reacts quantitatively and selectively with the evaporatable components, to measure the amount of them.

Next, while the measured amount in ppm of evaporatable components contained in the insulating film IF is monitored, such as repeatedly checked, each of the conductor segments 33a and 33b is dried naturally or heated up until the measured (checked) amount in ppm of evaporatable components substantially becomes equal to or lower than 20000 ppm in step S2.

Note that:

the amount in ppm of evaporatable components contained in part of the insulating film IF located adjacent to the bare portion 333c of each of the conductor segments 33a and 33b can be continuously or periodically measured by use of the Karl Fischer Method in step S1 of FIG. 10; and the part of the insulating film IF located adjacent to the bare portion 333c of each of the conductor segments 33a and 33b can be dried naturally or heated up until the measured (checked) amount in ppm of evaporatable components substantially becomes equal to or lower than 20000 ppm in step S2.

Figure 11:
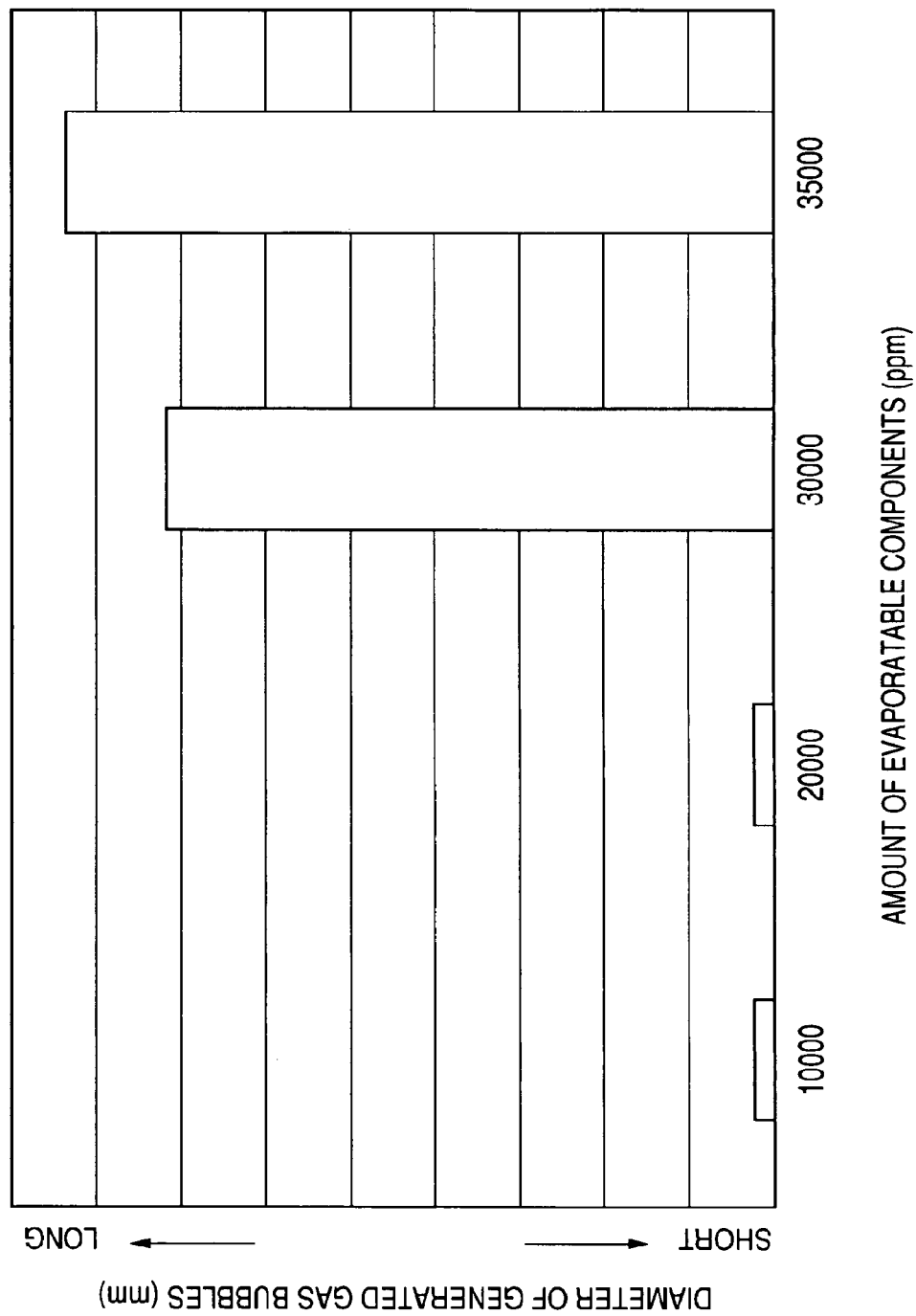
FIG. 11 is a graph schematically illustrating a relationship between the amount of evaporatable components contained in the insulating film covering a conductor segment and the degree of generation of gas bubbles generated around the corresponding conductor segment according to the embodiment.

Specifically, FIG. 11 illustrates a relationship between the amount of evaporatable components contained in the insulating film IF covering a conductor segment and the degree of generation of gas bubbles generated around the corresponding conductor segment. The relationship was obtained by carrying out experiments.

In the experiments, as a parameter indicative of the degree of gas bubbles generated around the corresponding conductor segment, a maximum diameter of the generated gas bubbles [unit: millimeters] was used. As a parameter indicative of the degree of generation of gas bubbles generated around the corresponding conductor segment, the number of the generated gas bubbles can be used.

Specifically, as the experiments, while reducing (adjusting) the amount in ppm of evaporatable components contained in the insulating film IF covering a conductor segment with the use of natural dry or heating from 35000 ppm to 10000 ppm, the maximum diameter of the generated gas bubbles was repeatedly monitored.

FIG. 11 clearly shows that, when the amount in ppm of evaporatable components contained in the insulating film IF is reduced from 30000 ppm up to 20000 ppm, the maximum diameter of the generated gas bubbles is greatly reduced.

Specifically, in the embodiment, adjustment of the amount in ppm of evaporatable components contained in the insulating film IF covering each conductor segment to a value equal to or lower than 20000 ppm allows the degree of gas bubbles generated around the corresponding conductor segment to be significantly reduced. This can prevent part of the insulating film IF from jacking from the conductor segment and from being blistered.

Figure 12:
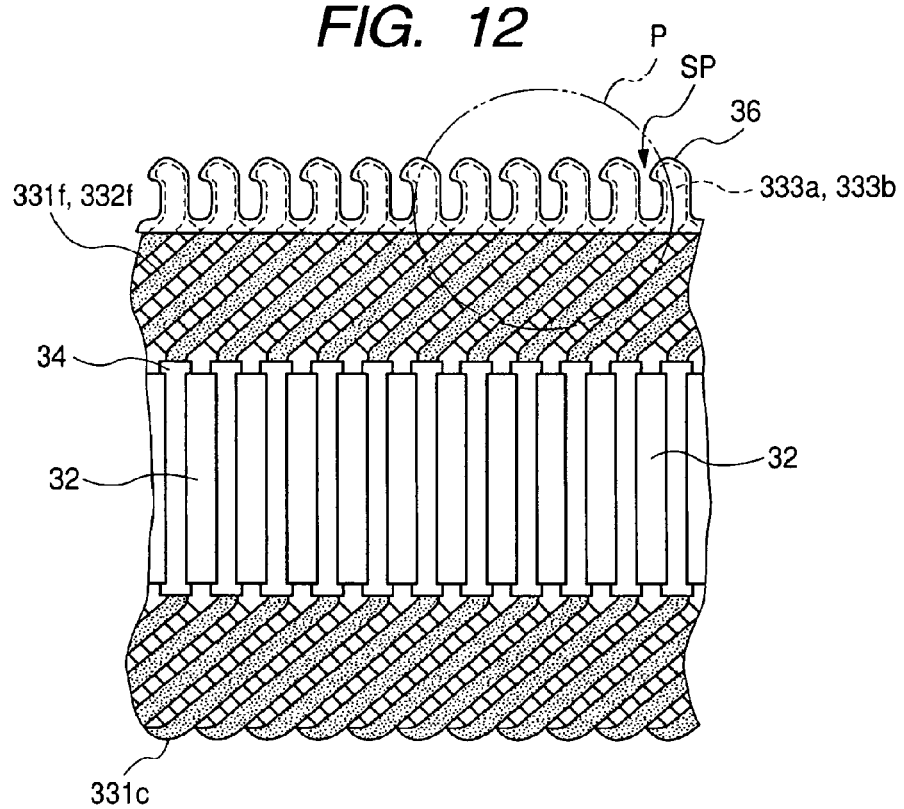
FIG. 12 is an enlarged view schematically illustrating the stator as viewed from the direction of arrow AR of FIG. 3.
Figure 13:
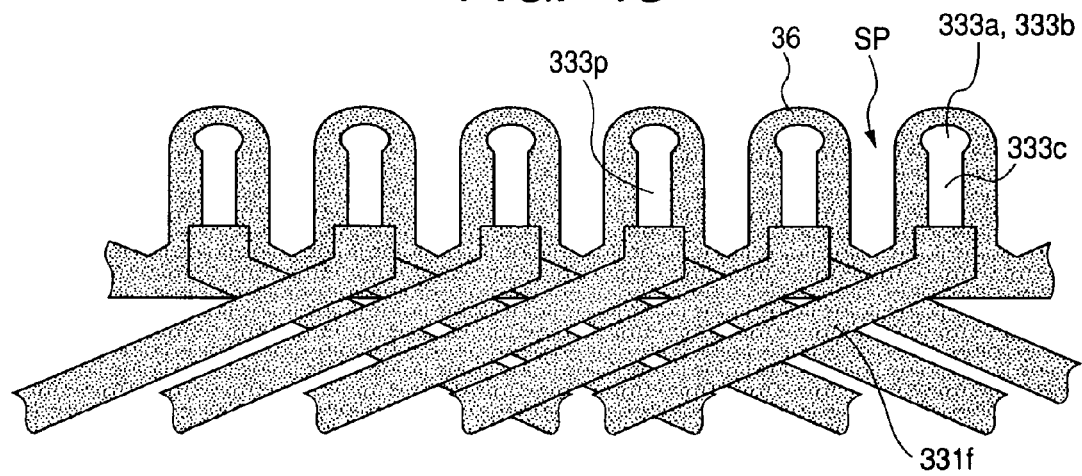
FIG. 13 is an enraged view of a portion of the stator circled by P.

In the embodiment, as illustrated in FIGS. 12 and 13, the joint portions 333a and 333b of the conductor segments 33a and 33b are preferably formed and covered with an insulating resin 36. The insulating resin 36 prevents a short-circuit between circumferentially adjacent joint portions 333a and between circumferentially adjacent joint portions 333b.

In addition, the joint portions 333a circumferentially arranged have substantially regular spaces SP therebetween, thus allowing the first coil end 35a to have a concave-convex structure.

Similarly, the joint portions 333b circumferentially arranged have substantially regular spaces SP therebetween.

Thus, it is possible to allow the first coil end 35a of the stator 3 to have a concave-convex structure.

The spaces SP prevent a short-circuit between adjacent joint portions. In addition, the concave-convex structured first coil end 35a and the spaces SP improve the cooling capability of the stator 3.

As described above, in the embodiment, the insulating film IF covering the periphery of each of the conductor segments 33a and 33b is formed up to part of the corresponding tip ends that extend in the axial direction of the stator core 32 (the axial direction of the rotary shaft 6.

For example, in order to increase each of the joint portions 333a and 333b in strength, comparatively higher heat input during the corresponding tip ends being joined to each other by TIG welding may cause deterioration of the insulating film IF to extend up to a portion 333p thereof; this portion 333p firstly intersects with an adjacent conductor segment with a predetermined space.

For this reason, when no thought is given to the amount of evaporated components contained in the insulating film IF, even if the insulating resin 36 covers the deteriorated portion of the insulating film IF, the jacking-up and/or blister of the deteriorated portion may deteriorate the adherence of the insulating film 36 onto the deteriorated portion of the insulating film IF.

This may cause foreign particles, such as dust particles, electrolyte components, and the like, to enter the gap between the insulating film 36 and the corresponding conductor segment, which deteriorates the electrical isolation between adjacent conductor segments.

In contrast, in the embodiment, adjustment of the amount in ppm of evaporatable components contained in the insulating film IF covering each conductor segment to a value equal to or lower than 20000 ppm allows the degree of gas bubbles generated around the corresponding conductor segment to be significantly reduced.

This can prevent part of the insulating film IF from jacking from the conductor segment and from being blistered, making it possible to prevent the adherence of the insulating film 36 onto the insulating film IF from deteriorating.

As described above, in the embodiment, the tip ends 331g and 331h of all of the large conductor segments 33a and the tip ends 332g and 332h are welded to each other in the same manner described above and illustrated in FIGS. 5 and 6 while the amount of evaporatable components contained in the insulating film IF is kept low. This prevents part of the insulating film IF covering a portion of each of the conductor segments 33a and 333b located adjacently to a corresponding joint portion 333a or 333b from deteriorating. This prevents foreign particles, such as dust particles, electrolyte components, and the like, from entering and staying in deteriorated portions of the insulating film IF.

In addition, when the joint portions 333a and 333b of the conductor segments 33a and 33b are covered with the insulating resin 36, the embodiment can increase the adherence of insulating film 36 onto the insulating film IF. This makes it possible to fully cover the joint portions and their surroundings with an amount of insulating resin 36 less than a normal amount of insulating resin determined in the case where no thought is given to the amount of evaporatable components contained in the insulating film IF. As a result, it is possible to reduce the cost of materials required to produce the stator 3 and improve environment resistance thereof.

The reduction in the amount of insulating resin 36 allows the spaces between circumferentially adjacent joint portions to be expanded. This permits the resistance of the cooling air through the first coil end portion 35a of the stator 3 to be reduced, further improving the cooling capacity thereof. In addition, the expansion of the spaces between circumferentially adjacent joint portions allows, even if foreign particles enter the frame 4, increase in the effect of discharging the entered foreign particles, making it possible to improve the environmental resistance of the stator 3.

Each of the joint portions 333a and 333b has the radially longitudinal length L2 longer than the radially longitudinal length L1 of each of the contact portion (332h, 331h') and the contact portion (332g, 331g'). This makes it possible to further improve the effect of preventing short-circuit between radially adjacent joint portions and between the outermost joint portions and the inner peripheral wall of the frame 4.

Each of the conductor segment units 33 consists of a pair of large and small conductor segments 33a and 33b, but can consist of a single conductor segment.

Figure 14:
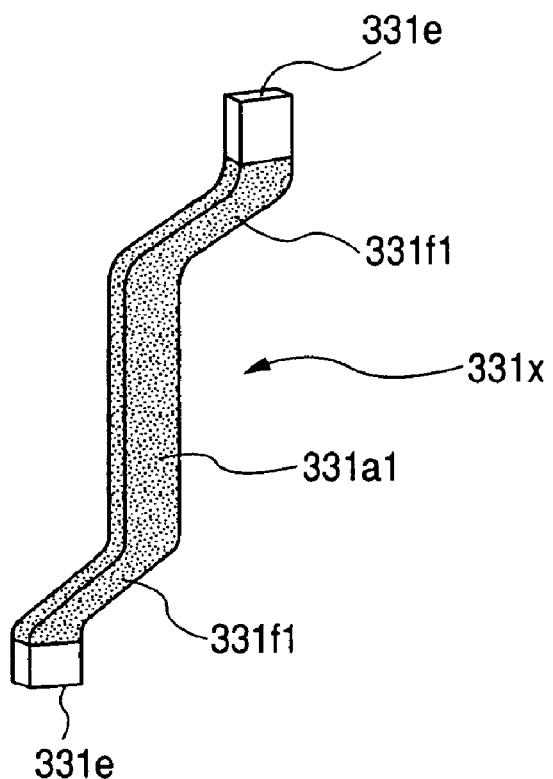
FIG. 14 is an enlarged perspective view schematically illustrating a conductor segment according to a modification of the embodiment.

As illustrated in FIG. 14, the U- or V-shaped conductor segments can be substituted by conductor segments 331X.

Each conductor segments 331X is composed of a straight portion 331a1, and a pair of inclined portions 331f1. The straight portion 331a1 having one end continuously extending one end of one of the paired inclined portions 331f1 is to be inserted into a corresponding slot 32S.

The other of the paired inclined portions 331f1 continues from the other end of the straight portion 33a1.

The one and the other inclined portions 331f1 and 331f2 project outside the corresponding slot 32S when the straight portion 331a1 is placed within the corresponding slot 32S so as to be outwardly bent with a predetermined electric angle with respect to the axial direction of the corresponding slot 32S.

The one and the other inclined portions 331f1 and 331f2 have respective tip ends 331e to be welded. The tip ends 331e are bent from the respective projective ends of the one and the other inclined portions 331f1 and 331f2 to extend in the axial direction of the stator core 32.

For example, one of the tip ends 331e of each of the conductor segments 331X can be connected to one of the tip ends 331e of a corresponding one of the conductor segments 331X to provide one or more radially-adjacent conductor-joint layers.

In the embodiment, the tip ends 331g and 331h of all of the large conductor segments 33a and the tip ends 332g and 332h are welded to each other so as to provide two radially-adjacent conductor-joint layers, but the present invention is not limited to the structure.

Specifically, the tip ends 331g and 331h of all of the large conductor segments 33a and the tip ends 332g and 332h of all of the small conductor segments 33b welded to each other can change the number of radially-adjacent conductor-joint layers.

In the embodiment, the number of the conductor segments 33a and 33b to be inserted into each slot 32S is set to four, providing two radially-adjacent conductor-joint layers. The present invention is however not limited to the structure.

Specifically, change of the number of the conductor segments 33a and 33b to be inserted into each slot 32S depending on the output characteristics of the alternator 1 can change the number of radially-adjacent conductor-joint layers.

Figure 15:
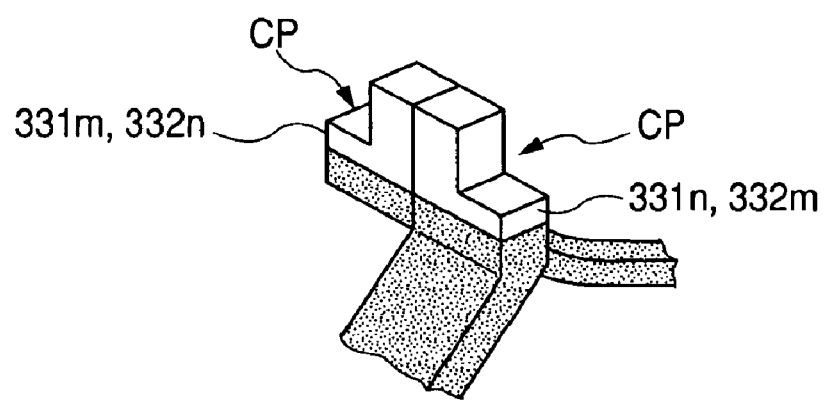
FIG. 15 is an enlarged perspective view schematically illustrating tip ends of a conductor segment according to another modification of the embodiment.

As illustrated in FIG. 15, a cutout portions CP can be formed at one of the paired lateral side surfaces 331m, 332n of each tip end and at one of the paired lateral side surfaces 331n, 332m of another tip end adjacent to each tip end; this one of the paired lateral side surfaces 331m, 332n of each tip end and this one of the paired lateral side surfaces 331n, 332m are not contacted to each other. This allows the radial length of a corresponding joint portion 333a or 333b to be further reduced. This makes it possible to still furthermore improve:

the effect of preventing short-circuit between radially adjacent joint portions and between the outermost joint portions and the inner peripheral wall of the frame 4;

the cooling capability of the stator 3; and the environmental resistance of the stator 3.

The lateral cross section of the bare portions 333c of each of the conductor segments 33a and 33b can be made polygonal instead of rectangular. Because the contact area of the adjacent bare portions 333c can be reduced, the insulating resin 36 can easily enter between the tip ends, making it possible to improve:

the effect of preventing short-circuit between radially adjacent joint portions and between the outermost joint portions and the inner peripheral wall of the frame 4;

the cooling capability of the stator 3; and the environmental resistance of the stator 3.

In the embodiment, the present invention is applied to an alternator for vehicles, but the present invention is not limited to the application. Specifically, the present invention can be applied to other types of rotary electric machines, such as motors for vehicles or the like.

While there has been described what is at present considered to be the embodiment and its modification of the present invention, it will be understood that various modifications which are not described yet may be made therein, and it is intended to cover in the appended claims all such modifications as fall within the true spirit and scope of the invention.

What is claimed is:

1. A rotary electric machine comprising:
   a rotor supported in a frame of the machine to be rotatable about an axis; and
   a stator disposed in the frame and opposing the rotor, the stator comprising:
      a stator core;
      a stator winding installed in the stator core and composed of a plurality of conductor segments each with a length, each of the conductor segments having first and second ends in a direction of the length thereof, at least one of the first and second ends of each of the conductor segments being at least partially joined to at least one of the first and second ends of a corresponding another one of the conductor segments to provide the stator winding including a plurality of joint portions of the plurality of conductor segments; and
      an insulating film covering each of the conductor segments except for at least the joint portions of the stator winding, at least part of the insulating film of each of the conductor segments being located close to a corresponding one of the joint portions, the at least part of the insulating film containing an evaporatable component, an amount in ppm of the evaporatable component contained in the at least part of the insulating film being adjusted to be equal to or lower than 20000 ppm.

2. A rotary electric machine according to claim 1, wherein at least one of the first and second ends of each of the conductor segments and at least one of the first and second ends of a corresponding another one of the conductor segments are aligned in a corresponding radial direction of the axis of the rotor, and the plurality of joint portions are annularly arranged.

3. A rotary electric machine according to claim 1, wherein at least one of the first and second ends of each of the conductor segments has a bare portion located adjacent to a corresponding one of the joint portions, the bare portion of at least one of the first and second ends of each of the conductor segments being uncovered with the insulating film.

4. A rotary electric machine according to claim 2, wherein the stator core has first and second end surfaces orthogonal to the axis of the rotor, each of the conductor segments has a portion projecting from one of the first and second end surfaces of the stator core to be inclined with respect to a direction parallel to the axis of the rotor, one of the first and second ends continues from one end of the inclined portion to be parallel to the axis of the rotor, and the insulating film is configured to cover each of the conductor segments up to the one end of the inclined portion thereof.

5. A rotary electric machine according to claim 2, wherein the plurality of joint portions are annularly arranged on the stator core to be spaced therebetween.

6. A rotary electric machine according to claim 2, further comprising a resin member coating each of the plurality of joint portions.

7. A rotary electric machine according to claim 5, further comprising a resin member coating each of the plurality of joint portions, the plurality of resin-member coated joint portions providing a concave-convex structure in a circumferential direction of the annular arrangement thereof.

8. A rotary electric machine according to claim 3, wherein the bare portion of each of the conductor segments has a predetermined length and a substantially polygonal shape in a cross section orthogonal to a direction of the length.

9. A rotary electric machine according to claim 1, wherein at least one of the first and second ends of each of the conductor segments is at least partially welded to at least one of the first and second ends of a corresponding another one of the conductor segments to provide the stator winding.

10. A rotary electric machine according to claim 1, wherein the stator core has a plurality of substantially circumferentially spaced slots, and each of the conductor segments comprises:

a pair of straight portions inserted in corresponding two of the slots;

a U-shaped turn portion continuously extending from one ends of the paired straight portions; and a pair of portions respectively projecting from the other ends of the paired straight portions from the corresponding two of the slots to be inclined with respect to a direction parallel to the axis of the rotor, the first and second ends continue from one ends of the paired inclined portions, the insulating film being configured to cover each of the conductor segments up to the one ends of the paired inclined portions thereof.

11. A stator to be disposed opposing a rotor of a rotary electric machine, the stator comprising:

a stator core;

a stator winding installed in the stator core and composed of a plurality of conductor segments each with a length, each of the conductor segments having first and second ends in a direction of the length thereof, at least one of the first and second ends of each of the conductor segments being at least partially joined to at least one of the first and second ends of a corresponding another one of the conductor segments to provide the stator winding including a plurality of joint portions of the plurality of conductor segments; and an insulating film covering each of the conductor segments except for at least the joint portions of the stator winding, at least part of the insulating film of each of the conductor segments being located close to a corresponding one of the joint portions, the at least part of the insulating film containing an evaporatable component, an amount in ppm of the evaporatable component contained in the at least part of the insulating film being adjusted to be equal to or lower than 20000 ppm.

12. A method of adjusting an amount of an evaporatable component contained in at least part of an insulating film, the insulating file coating each of a plurality of conductor segments of a stator winding except for a plurality of joint portions of the stator winding, each of the plurality of conductor segments having a length and having first and second ends in a direction of the length thereof, the plurality of joint portions being formed by at least partially joining at least one of the first and second ends of each of the conductor segments to at least one of the first and second ends of a corresponding another one of the conductor segments, the at least part of the insulating film of each of the conductor segments being located close to a corresponding one of the joint portions, the method comprising:

measuring an amount in ppm of an evaporatable component contained in the at least part of the insulating film; and vaporizing part of the evaporatable component contained in the at least part of the insulating film while repeatedly checking the measured amount in ppm of the evaporatable component contained in the at least part of the insulating film.

13. A method according to claim 12, wherein the vaporizing is vaporizing part of the evaporatable component contained in the at least part of the insulating film while repeatedly checking the measured amount in ppm of the evaporatable component contained in the at least part of the insulating film until the measured amount in ppm of the evaporatable component contained in the at least part of the insulating film substantially becomes equal to or lower than 20000 ppm.

14. A method according to claim 13, wherein the plurality of joint portions are formed by at least partially welding at least one of the first and second ends of each of the insulating-film coated conductor segments to at least one of the first and second ends of a corresponding another one of the conductor segments, and the vaporizing is to dry naturally the at least part of the insulating film after the welding.

15. A method according to claim 13, wherein the plurality of joint portions are formed by at least partially welding at least one of the first and second ends of each of the insulating-film coated conductor segments to at least one of the first and second ends of a corresponding another one of the conductor segments, and the vaporizing is to heat up the at least part of the insulating film after the welding.

* * * * *